(12) United States Patent
Buss et al.

(10) Patent No.: US 6,817,675 B2
(45) Date of Patent: Nov. 16, 2004

(54) MOTOR VEHICLE SEAT

(75) Inventors: Henning Buss, Gerlingen (DE); Karl-Heinz Minuth, Grafenau (DE); Karl Pfahler, Stuttgart (DE); Lothar Renner, Nufringen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/371,949

(22) Filed: Feb. 20, 2003

(65) Prior Publication Data
US 2003/0230913 A1 Dec. 18, 2003

(30) Foreign Application Priority Data
Feb. 22, 2002 (DE) .......................................... 102 07 490

(51) Int. Cl.[7] .................................................. A47C 7/02
(52) U.S. Cl. ............................. 297/452.6; 297/452.42; 297/180.11; 297/180.14; 297/452.43; 5/653
(58) Field of Search ........................... 5/653, 453, 455; 297/180, 180.11, 180.14, 452.36, 452.37, 452.38, 452.42, 452.46, 452.47

(56) References Cited

U.S. PATENT DOCUMENTS

| 3,874,731 A | * | 4/1975 | Jordan | 297/452.52 |
|---|---|---|---|---|
| 4,084,775 A | * | 4/1978 | Pelly | 297/452.42 |
| 4,685,727 A | * | 8/1987 | Cremer et al. | 297/180.14 |
| 4,696,516 A | * | 9/1987 | Yeum | 297/452.37 |
| 5,403,065 A | * | 4/1995 | Callerio | 297/180.11 |
| 5,544,942 A | * | 8/1996 | Vu Khac et al. | 297/452.37 |
| 5,564,144 A | * | 10/1996 | Weingartner et al. | 297/452.27 |
| 5,850,645 A | * | 12/1998 | Ogawa et al. | 5/653 |
| 6,003,950 A | * | 12/1999 | Larsson | 297/452.42 |
| 6,109,688 A | * | 8/2000 | Wurz et al. | 297/180.14 |
| 6,189,966 B1 | * | 2/2001 | Faust et al. | 297/180.14 |
| 6,226,819 B1 | * | 5/2001 | Ogawa et al. | 5/653 |
| 6,247,751 B1 | * | 6/2001 | Faust et al. | 297/180.13 |
| 6,273,810 B1 | * | 8/2001 | Rhodes et al. | 454/120 |
| 6,481,801 B1 | * | 11/2002 | Schmale | 297/452.27 |
| 6,546,578 B1 | * | 4/2003 | Steinmeier | 5/653 |
| 6,629,724 B2 | * | 10/2003 | Ekern et al. | 297/180.11 |

FOREIGN PATENT DOCUMENTS

DE 100 24 879 10/2001

* cited by examiner

Primary Examiner—Peter M. Cuomo
Assistant Examiner—Erika Garrett
(74) Attorney, Agent, or Firm—Kenyon & Kenyon

(57) ABSTRACT

A motor vehicle seat includes padding which is assigned to a backrest or a seat cushion and includes a lower padding part, a ventilation layer which rests on the lower padding part and through which air may flow, and an air-permeable, upper padding layer arranged above the latter, the padding covered by upholstery and provided with stitching along which the upholstery is connected to the upper padding layer via fastening device(s), and the ventilation layer extending into side parts of the padding and having a virtually unchanged thickness in the region of the stitching.

The upholstery and the upper padding layer are fastened to the lower padding part along the stitching via the fastening device(s) bridging the ventilation layer.

20 Claims, 4 Drawing Sheets

MOTOR VEHICLE SEAT

CROSS-REFERENCE TO RELATED APPLICATIONS

The present application claims priority from Application No. 102 07 490.9, filed in the Federal Republic of Germany on Feb. 22, 2002, which is expressly incorporated herein in its entirety by reference thereto.

FIELD OF THE INVENTION

The present invention relates to a motor vehicle seat having padding which is assigned to a backrest or a seat cushion.

BACKGROUND INFORMATION

A seat of this type having padding assigned to a backrest of a seat cushion is described in German Published Patent Application No. 100 24 879, the padding including a lower padding part made of foam material, rubberized hair, firm nonwoven material or the like, a ventilation layer which rests on the lower padding part and through which air can flow, and an air-permeable, upper padding layer arranged above the latter. In this case, the padding is covered by upholstery and is provided with stitching along which the upholstery is connected to the upper padding layer via fastening means. So that the side parts of the padding, which are divided off from the seat panel by stitching, can likewise be supplied with air by the fan for the seat panels for ventilating the seat, the ventilation layer extends into side parts of the padding. In order to achieve a sufficient supply of air to the side parts, the ventilation layer has a virtually unchanged thickness in the region of the stitching.

It is an object of the present invention to provide a seat that may have a greater appearance of quality and improved comfort properties.

SUMMARY

The above and other beneficial objects of the present invention are achieved by providing a motor vehicle seat as described herein.

In the case of the motor vehicle seat according to the present invention, the upholstery and the upper padding layer are also fastened to the lower padding part along the stitching—bridging the ventilation layer. By this arrangement, the upholstery and the upper padding layer, and also the ventilation layer, may no longer move relative to the lower seat part, for example, when a seat occupant gets in, as a result of which a shape- and size-maintaining arrangement of the padding with improved quality and comfort properties may be ensured.

A non-slip arrangement of the ventilation layer on the lower padding part may be produced if the ventilation layer is arranged in a, e.g., peripherally closed cavity in the lower padding part in the manner such that it springs back at least at the side parts relative to the upper edge side of the padding. In addition, the shape and size-maintaining arrangement of the padding may be even further improved by this arrangement, since the foam material, the rubberized hair, etc., may be designed to be softer and more homogeneous in the edge region of the lower padding part than the ventilation layer, which consists, for example, of rubberized hair or spacer knit.

Further aspects, features and details of the present invention described below with reference to an exemplary embodiment and with reference to the drawings.

DETAILED DESCRIPTION

Figure 1:
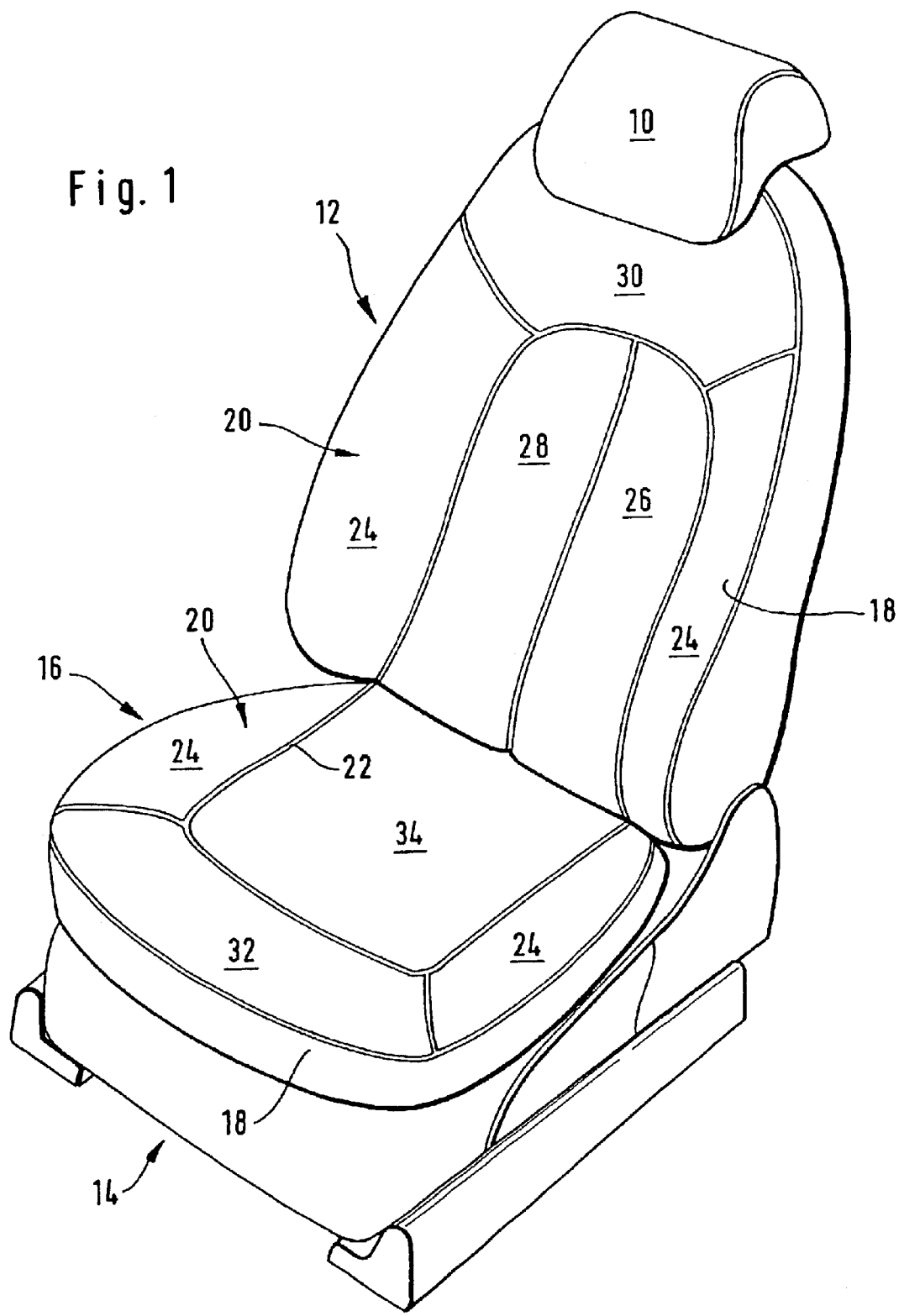
FIG. 1 is a schematic perspective view of a motor vehicle seat according to the present invention having padding assigned to a backrest or a seat cushion.

FIG. 1 is a schematic perspective view of a motor vehicle seat having a backrest 12 supporting a head restraint 10, and a seat cushion 16 resting on a seat underframe 14. The seat cushion 16 and the backrest 12 in each case include padding 20 which is covered by upholstery 18 and is divided into a plurality of subsections by stitching 22. The backrest 12 thus includes side parts 24 and also a left, right and upper seat panel region 26, 28, 30, and the seat cushion 16 includes side parts 24 and a front and rear seat panel region 32, 34.

Figure 2:
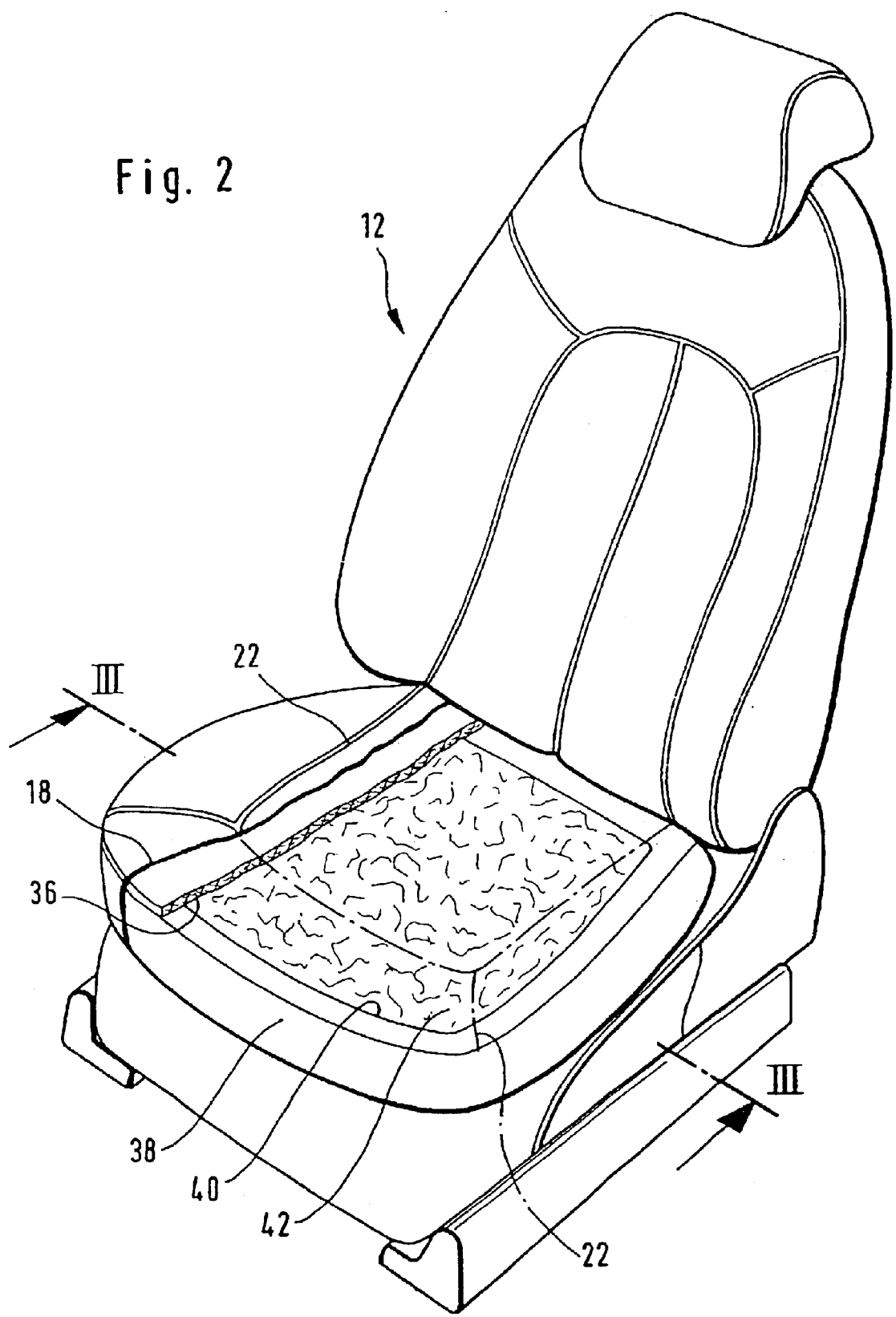
FIG. 2 is a further schematic perspective view of the motor vehicle seat illustrated in FIG. 1, in which, from the padding of the seat cushion, the upholstery and an upper padding layer have been partially omitted.

FIG. 2 is a further schematic perspective view of the motor vehicle seat illustrated in FIG. 1, in which, from the padding 20 of the seat cushion 16, the upholstery 18 and an upper padding layer 36 have been partially omitted. This enables a lower padding part 38 of the padding 20 to be seen, which part consists of foam material, rubberized hair, firm nonwoven material, etc. and from which a peripherally closed cavity 40, which is still to be explained in greater detail further on, has been left out. Arranged within the cavity 40 is a ventilation layer 42 through which air may flow and which is matched in size to the latter and extends from the front and rear seat panel region 32, 34 into the side parts 24 of the seat cushion 16.

Figure 3:
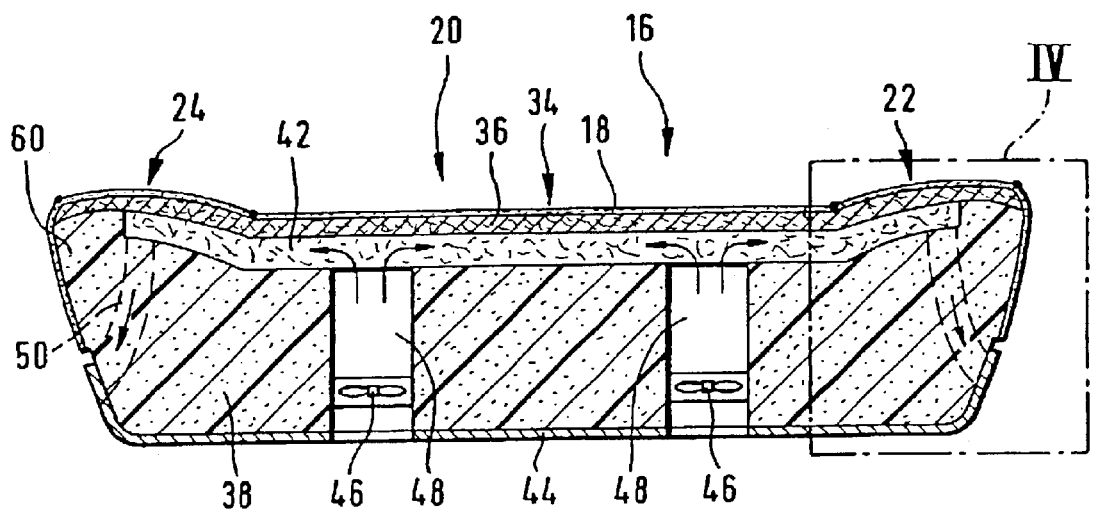
FIG. 3 is a schematic cross-sectional view through the padding of the seat cushion illustrated in FIGS. 1 and 2 taken along the line III—III illustrated in FIG. 2.
Figure 4:
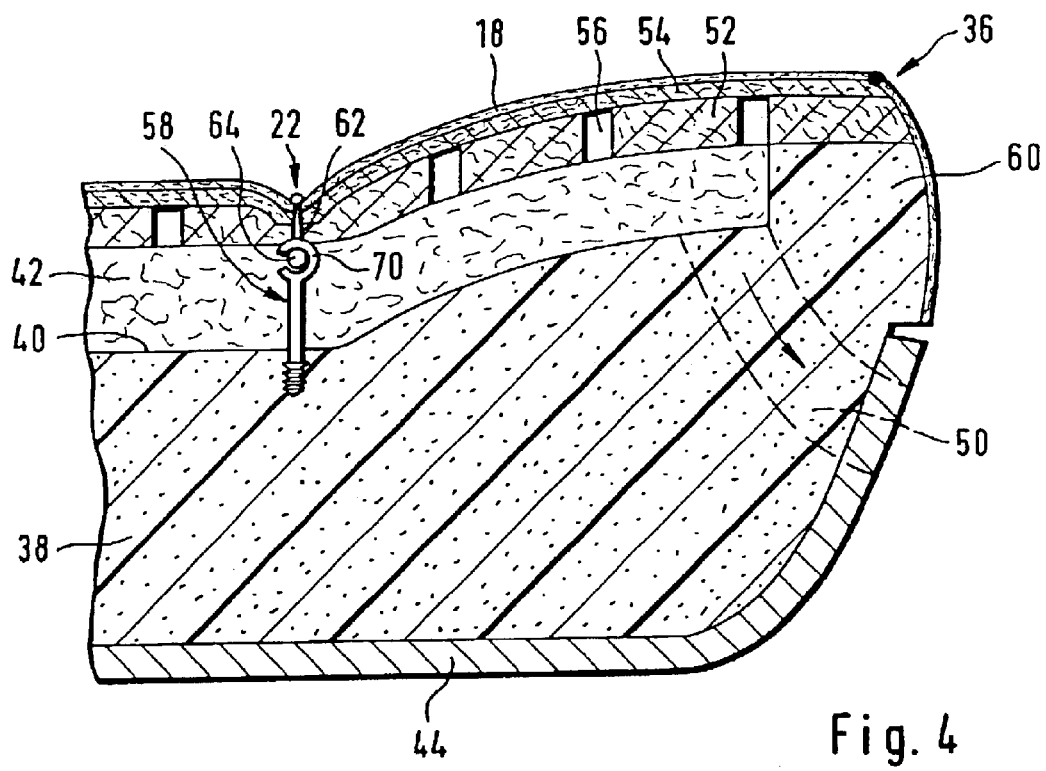
FIG. 4 is an enlarged illustration of the detail IV of the padding illustrated in FIG. 3.

When viewing FIG. 2 together with FIG. 3, which is a schematic cross-sectional view through the padding 20 of the seat cushion 16, it is illustrated that the ventilation layer 42, through which air may flow and which consists of roughly textured nonwoven material, for example, rubberized hair, spacer knit, etc., is matched in its thickness to the cavity 42 in the lower padding part 38. The lower padding part 38 is held by a trough-shaped seat support 44 which, for its part, rests on the seat underframe 14, which is illustrated in FIG. 1. The ventilation layer 20 is to be supplied here with air by a plurality of electrically operated fans 46. The fans 46 are arranged within air inlet channels 48 which extend perpendicularly with respect to the ventilation layer and which—penetrating the seat support 44—extend from the lower side of the lower padding part 38 as far as the cavity 40 with the ventilation layer 42 arranged in it. Via the air inlet channels 48, relatively dry air passes—as indicated by arrows—into the ventilation layer 42, is distributed in the ventilation layer 42, absorbs moisture from the seat occupant, in a manner which is yet to be explained further on, and flows back out of the ventilation layer 42 via air outlet channels 50 (indicated by dashed lines) in the lower padding part 38. The upper padding layer 36, which is arranged between the ventilation layer 42 and the upholstery 18, includes—as illustrated in FIG. 4—a lower layer 52 and an upper layer 54 consisting in each case of air-permeable padding wadding, a woollen nonwoven or an open-pored foam material, etc. The upper padding layer 36 is provided with a multiplicity of blind holes 56 which, penetrating the lower layer 52, are overlapped by the upper layer 54 and are arranged in the region of overlap with the ventilation layer 42. In the exemplary embodiment illustrated, heating wires of an electrical seat heating system are also arranged between the lower layer 52 and the upper layer 54. The upholstery 18 consists of textile material, perforated leather, plastic, etc.

It is illustrated in FIG. 4 that—in the region of the stitching 22 between the seat panel region 34 and the side part 24 of the seat cushion 16—the ventilation layer 42, which extends into the side parts 24, has a virtually unchanged thickness, with the result that an air flow produced by the fans 46 within the ventilation layer 42 may flow without obstruction in the region of the stitching 22 until it reaches the side part 24. In order to ensure that the upper padding layer 36 and the upholstery 18 are well fastened to the lower padding part 38, the two parts 18, 38 may be connected to each other and to the lower padding part 38 along the stitching 22 via fastening device 58, which is still to be explained further on with reference to FIG. 5.

At the side parts 24 and at the front seat panel region 32—as illustrated in FIGS. 2 to 4—the ventilation layer 42 is arranged in a manner such that it springs back relative to the upper edge side 60 of the padding 20 or of the lower padding part 38. In other words, the cavity 40 is also arranged in the manner such that it springs back relative to the upper edge sides 60 of the side parts 24 and of the front seat panel region 32. This, firstly, obtains a shape- and size-maintaining arrangement of the padding 20 and, secondly, an increase in comfort, since the foam material of the lower padding part 38 may be arranged to be softer and more homogeneous than the ventilation layer 42, which consists, for example, of rubberized hair, spacer knit, etc. In addition, the ventilation layer 42 is secured against displacement in the horizontal direction by the arrangement with the cavity 40.

Figure 5:
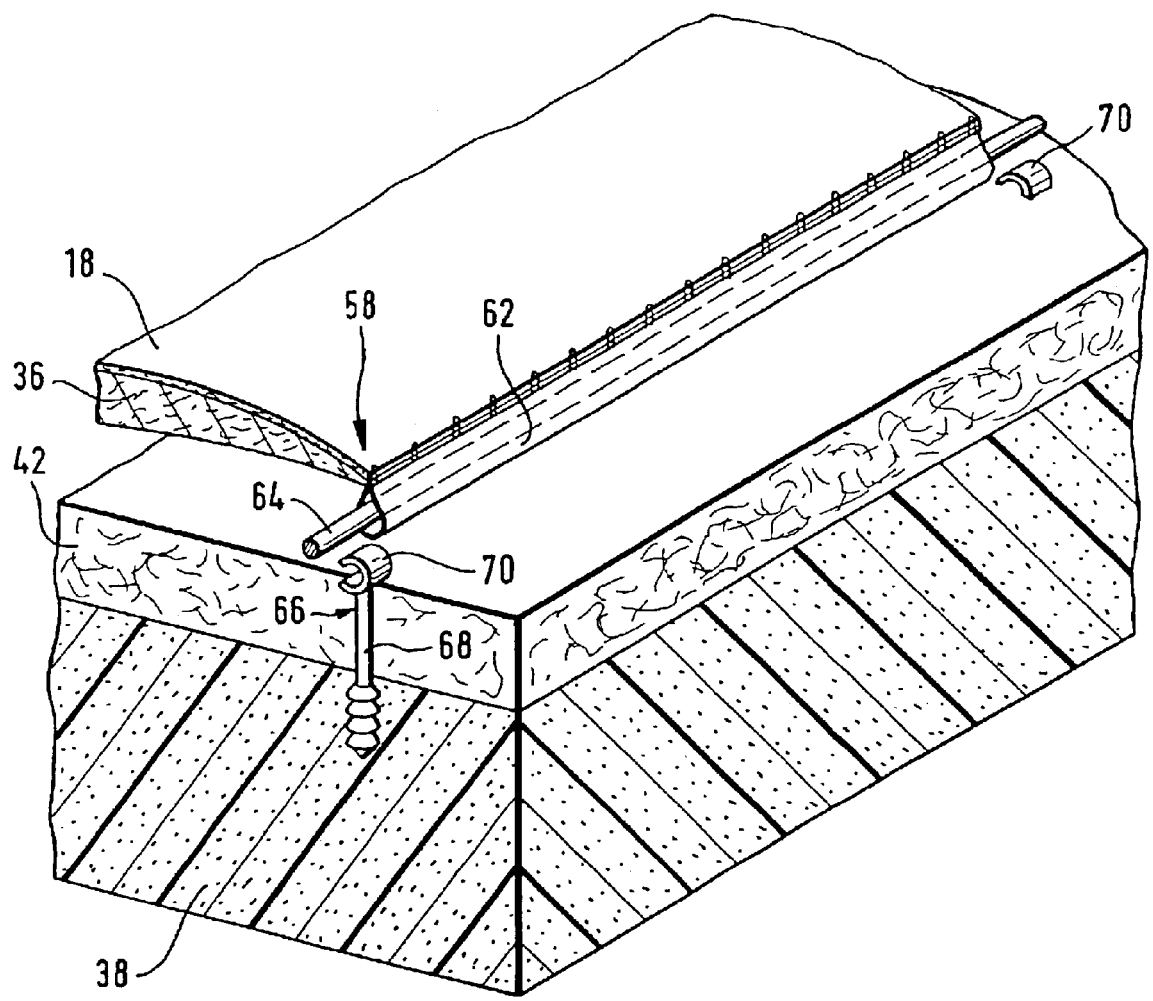
FIG. 5 is a schematic perspective view of the fastening of the upholstery and of the upper padding layer to the lower padding part of the seat cushion.

In an overall view with FIG. 5, in a schematic perspective view, the fastening of the upholstery 18 and of the upper padding layer 36 to the lower padding part 38 of the seat cushion 16 along the stitching 22 is illustrated. In this case, the upholstery 18 and the upper padding layer 36 have been illustrated cut off along the stitching 22. On the lower side of the upper padding layer 36, a pocket 62 which is oval in cross section and consists, for example, of material, etc., is sewn along the stitching 22. The pocket 62 is sewn to the upholstery 18 and to the upper padding layer 36, as a result of which—as illustrated in FIG. 4—the upper padding layer 36 is reduced in its thickness in the region of the stitching 22. A metal or plastic rod 64 is inserted into the pocket 62, which is open at the front and rear. In order to fix the upholstery 18 and the upper padding layer 36 to the lower padding part 38, the rod 64 is fitted releasably into tensile connecting elements 66 in the form of latching hooks which, for their part, are fastened to the lower padding part 38 in the manner of a peg. The stem 68 of the latching hooks 66 is dimensioned in its length in such a manner that the head 70 of the latching hooks 66 ends approximately flush with the upper side of the ventilation layer 42 or protrudes slightly above the latter. When the rod 64 is fitted in the latching hooks 66, the rod therefore rests on the upper side of the ventilation layer 42 without significantly constricting the thickness of the ventilation layer 42. This may ensure that the flow of air overflows from the seat panel regions 32, 34 into the side parts 24 and that the upholstery 18 together with the upper padding layer 36 is fastened securely to the lower padding part 38—bridging the ventilation layer 42. Instead of the latching hooks 66 illustrated, other tensile connecting elements may also be possible which may be used to ensure that the upholstery 18 and the upper padding layer 36 are fastened to the lower seat part in the region of the stitching 22 without a significant constriction in the thickness of the ventilation layer 42. The upholstery 18 and the upper padding layer 36 may also be fastened to the lower padding part 38 in a different manner without the rods 64—for example, via tensile wires. The padding of the backrest 12 may have the same construction as the padding of the seat cushion 16.

The ventilation of the seat functions as follows: when the seat ventilation is activated, relatively dry air is sucked in from suitable points in the vehicle interior via the fans 46 and blown into the ventilation layer 42. The air which has been blown in then flows through the ventilation layer 42 below the seat panel regions 26 to 34 and the edge sides 24 and then flows back out through air outlet openings 50. Moisture produced by the seat occupant diffuses through the upholstery 18 and the upper padding layer 36 and is absorbed by the dry air flow in the ventilation layer and transported to the outside. The moisture is absorbed, e.g., in the region of the blind holes 56 of the upper padding layer 36. In this case, use is made of the relatively high temperature gradients between the dry air flowing into the ventilation layer and the moist, warm air of the vehicle occupant, as a result of which the moisture may be very readily absorbed by the air flowing in and may be transported away. This may avoid blowing air against the vehicle occupant.

What is claimed is:

1. A motor vehicle seat, comprising:

padding assigned to one of a backrest and a seat cushion and including a lower padding part, a ventilation layer arranged to rest on the lower padding part and through which air is flowable, and an air-permeable, upper padding layer arranged above the ventilation layer;

upholstery covering the padding;

stitching; and a fastening arrangement configured to connect the upholstery to the upper padding layer along the stitching;

wherein the ventilation layer extends into side parts of the padding and includes a virtually unchanged thickness in a region of the stitching;

wherein the fastening arrangement is configured to fasten the upholstery and the upper padding layer to the lower padding part along the stitching and to bridge the ventilation layer; and wherein fans blow air into the ventilation layer.

2. The motor vehicle seat according to claim 1, wherein the ventilation layer is configured to spring back at least at the side parts relative to the upper edge side of the padding.

3. The motor vehicle seat according to claim 2, wherein the lower padding part includes a peripherally closed cavity, the ventilation layer arranged in the peripherally closed cavity.

4. The motor vehicle seat according to claim 3, further comprising:

tensile connecting elements fixed on the lower padding part; and rods fastened along the stitching on a lower side of the upper padding layer, the rods fastenable to the tensile connecting elements.

5. The motor vehicle seat according to claim 4, wherein the tensile connecting elements include latching hooks, the rods configured to fit releasably into the latching hooks after installation.

6. The motor vehicle seat according to claim 3, further comprising pockets sewn onto a lower side of the upper padding layer, the rods inserted into the pockets.

7. The motor vehicle seat according to claim 6, wherein the pockets are sewn to the upholstery and the upper padding layer.

8. The motor vehicle seat according to claim 1, wherein the upper padding layer includes a plurality of blind holes arranged in a region of overlap with the ventilation layer.

9. A motor vehicle seat, comprising:
  padding assigned to one of a backrest and a seat cushion and including a lower padding part, a ventilation layer arranged to rest on the lower padding part and through which air is flowable, and an air-permeable, upper padding layer arranged above the ventilation layer;
  upholstery covering the padding;
  stitching; and
  fastening means for connecting the upholstery to the upper padding layer along the stitching;
  wherein the ventilation layer extends into side parts of the padding and includes a virtually unchanged thickness in a region of the stitching;
  wherein the fastening means fastening the upholstery and the upper padding layer to the lower padding part along the stitching and bridging the ventilation layer; and
  wherein fans blow air into the ventilation layer.

10. The motor vehicle seat according to claim 9, wherein the ventilation layer is configured to spring back at least at the side parts relative to the upper edge side of the padding.

11. The motor vehicle seat according to claim 10, wherein the lower padding part includes a peripherally closed cavity, the ventilation layer arranged in the peripherally closed cavity.

12. The motor vehicle seat according to claim 11, further comprising:
  tensile connecting elements fixed on the lower padding part; and
  rods fastened along the stitching on a lower side of the upper padding layer, the rods fastenable to the tensile connecting elements.

13. The motor vehicle seat according to claim 12, wherein the tensile connecting elements include latching hooks, the rods configured to fit releasably into the latching hooks after installation.

14. The motor vehicle seat according to claim 11, further comprising pockets sewn onto a lower side of the upper padding layer, the rods inserted into the pockets.

15. The motor vehicle seat according to claim 14, wherein the pockets are sewn to the upholstery and the upper padding layer.

16. The motor vehicle seat according to claim 9, wherein the upper padding layer includes a plurality of blind holes arranged in a region of overlap with the ventilation layer.

17. The motor vehicle seat according to claim 1, wherein the lower padding part includes at least one of a foam material, rubberized hair, and a nonwoven material.

18. The motor vehicle seat according to claim 1, wherein the ventilation layer includes at least one of a spacer knit, rubberized hair, and a nonwoven material.

19. The motor vehicle seat according to claim 1, wherein the fans are arranged within air inlet channels.

20. The motor vehicle seat according to claim 1, wherein the upper padding layer includes at least one of an air-permeable padding, a woollen nonwoven material, and an open-pored form material.

* * * * *